(12) United States Patent
Ohnishi

(10) Patent No.: US 6,320,710 B1
(45) Date of Patent: Nov. 20, 2001

(54) TAPE REPRODUCTION APPARATUS AND METHOD

(75) Inventor: Nobuhiro Ohnishi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/390,837

(22) Filed: Sep. 7, 1999

(30) Foreign Application Priority Data

Sep. 21, 1998 (JP) .................................. 10-266949

(51) Int. Cl.[7] ....................................... G11B 5/02
(52) U.S. Cl. ..................... 360/22; 360/72.2; 360/49; 360/53
(58) Field of Search .............. 360/72.2, 49, 50, 360/22, 46, 53, 72.1

(56) References Cited

U.S. PATENT DOCUMENTS 4,646,170 * 2/1987 Kobayashi et al. .................... 360/22

FOREIGN PATENT DOCUMENTS 56169211    12/1981    (JP) .

* cited by examiner

Primary Examiner—Alan T. Faber
(74) Attorney, Agent, or Firm—Hayes, Soloway, Hennessey, Grossman & Hage P.C.

(57) ABSTRACT

The present invention enables to preferably correct mark patterns reproduced in parallel from a magnetic tape. A mark detection block 204 successively identifies as one of the plurality mark patterns a plurality of binary data reproduced in parallel from the magnetic tape, and confirms a mark pattern whose reproduction time has reached a reference time. A mark holding block 211 holds a mark pattern whose reproduction is integrated. A mark pattern discontinuity detection block 121 detects a discontinuity and the discontinuity integrating block 213 counts the number of discontinuity times. This discontinuous number of times and the mark pattern held are output together with the confirmed mark pattern, thus correcting the mark pattern appropriately.

13 Claims, 7 Drawing Sheets

TAPE REPRODUCTION APPARATUS AND METHOD

BACKGROUND OF THE INVENTION

1. Field of the Invention

The present invention relates to a tape reproduction apparatus and method for reproducing and outputting a mark pattern recorded in parallel to a magnetic tape.

2. Description of the Related Art

A conventional tape reproduction apparatus using a magnetic tape as a recording medium is also used for a data recording in a computer system. The magnetic tape and the tape reproduction apparatus have simple configurations and cost not much. The magnetic tape can be used for recording a plurality of data items in parallel to one another in a plurality of tracks.

There are various types of magnetic tapes for recording a data processed in a computer system. For example a 18-track product is widely spread. The 18-track magnetic tape is usually divided into six zones, each consisting of three tracks as shown below.

TABLE 1

| Track | Zone |
|---|---|
| 1 | A |
| 2 | B |
| 3 | C |
| 4 | D |
| 5 | E |
| 6 | F |
| 7 | A |
| 8 | B |
| 9 | C |
| 10 | D |
| 11 | E |
| 12 | F |
| 13 | A |
| 14 | B |
| 15 | C |
| 16 | D |
| 17 | E |
| 18 | F |

On the other hand, a plurality of types of mark patterns recorded on the aforementioned magnetic tape consist of 6 bits. The 6-bit binary data is recorded in parallel in the six zone. The binary data thus recorded is called a tone signal and all one signal. The tone signal is a serial 6 bits of "100000" and the all one signal is a serial 6 bits of "111111".

However, this has no direct relation to the present invention. Hereinafter, for the 6 bits of the mark pattern are related to 6 data tracks of the magnetic tape. The binary data constituting a mark pattern will be explained simply as a tone signal and all one signal.

Here, a conventional tape reproduction apparatus having the aforementioned configuration will be explained with reference to FIG. 6. FIG. 6 is a block diagram showing a conventional tape reproduction apparatus. The tape reproduction apparatus 100 has a tape drive block 101, which is connected via an analog/digital (A/D) conversion circuit 102 to a signal generation circuit 103.

The signal generation circuit 103 is connected to a mark detection circuit 104, which is connected to five mark length counters 105 for accumulating time values. That is, as shown in FIG. 7, five mark patterns are recorded on the magnetic tape as different binary data items. Corresponding to these mark patterns, five mark length counters 105 are provided.

It should be noted that the aforementioned five mark patterns are DID (density identity), IDS (identity separator), IBG (inter block gap), TM (tape mark), and ERG (erase gap).

Each of the five mark length counters 105 is connected to a corresponding comparison circuit 106 serving as mark confirmation blocks. These comparison circuits 106 are connected to a microcomputer 107.

It should be noted that this tape reproduction apparatus 100 also includes a clock circuit (not depicted), which is connected to the aforementioned circuits 103 to 106.

The tape drive block 101 includes a tape drive mechanism and a magnetic head (not depicted). This magnetic head, the A/D conversion circuit 102, and the signal generation circuit 103 constitute a data reproduction block. The tape drive mechanism has a drive motor and a tape role up reel. As has been explained above, the magnetic tape (not depicted) is linearly moved on the 6 tracks (actually 18 tracks).

The magnetic head reads the six data tracks in parallel and the A/D conversion circuit 102 convert in serial respective analog signals into digital signals. If the serial digital signal is "100000", the signal generation circuit 103 generates the tone signal which is one of the binary data, in synchronization with a reference signal of the clock circuit. Otherwise, the signal generation circuit generates the other of the binary data, i.e., the all one signal.

The mark detector circuit 104 successively identifies five mark patterns in the six parallel binary data successively generated in serial, and upon identification, transmits an enable signal to a corresponding mark length counter 105. The mark length counter integrates the input time as a reproduction time of the mark pattern by a reference clock.

In each of the comparison circuits 106, a predetermined reference time is set in advance assuming "90%" of the ANSI (American National Standards Institute). When a reproduction time integrated by the corresponding mark length counter 105 connected has reached the reference time, the comparison circuit confirms its mark pattern and outputs a detection signal to the microcomputer.

It should be noted that a recording time in the magnetic tape differs depending on the mark pattern type and accordingly, the aforementioned reference time is set for each of the mark patterns. Consequently, the aforementioned tone signal of "100000" and the all one signal of "111111" are repeatedly recorded on the magnetic tape by a predetermined number of times for each of the mark patterns.

The microcomputer 107 includes a CPU (central processing unit) a ROM (read only memory) and RAM (random access memory). The CPU performs various data processing using a work area of the RAM corresponding to an appropriate control program as a firmware piece loaded in the ROM in advance.

More specifically, the microcomputer 107 accepts a detection signal of the mark patterns from the comparison circuit 106 and outputs the detection signal outside as a magnetic tape reproduction result. Each time a mark pattern detection signal is received, all the five mark length counters 105 are reset.

The tape reproduction apparatus 100 having the aforementioned configuration can reproduce in serial the mark patterns recorded as combinations of the binary data in parallel on the magnetic tape. In this case, the tape drive unit 101 linearly moves the magnetic tape and reads the six data tracks in parallel and in serial. The six analog signals are respectively converted into digital signals by the A/D converter 102.

If the serial digital signal thus converted is "100000", the signal generation circuit 103 generates a tone signal, and otherwise, the all one signal is generated. The six binary data items successively reproduced in serial are identified as one of the five mark patterns by the mark detection circuit 104.

The mark detection circuit 104 which has identified the mark pattern outputs an enable signal to the corresponding one of the five mark length counters 105. The mark length counter 105 which has received the enable signal integrates the input lapse time as the mark pattern reproduction time.

The reproduction time integrated by the mark length counter 105 is compared to a predetermined reference time in the comparison circuit 106 connected to the counter. When the reproduction time to be integrated has reached this reference time, a mark pattern detection signal is produced to the microcomputer 107.

Here, the mark pattern detection signals produced from the five comparison circuits 106 are output by the microcomputer outside in serial. Thus, each time a mark pattern detection signal is accepted, the five mark length counters 105 are all reset.

The tape reproduction apparatus 100 having the aforementioned configuration can reproduce in serial the mark patterns recorded as combinations of parallel binary data on a magnetic tape.

However, the magnetic tape is easily worn out physically and an information recorded on it is remarkable deteriorated as the time lapses. Accordingly, there is a case that it is difficult to reproduce the information recorded. For example, before the first type mark pattern reproduction reaches the reference time, reproduction of the second type mark pattern may be started, and before the reproduction of the second type mark pattern reaches the reference time, another first type mark pattern may be started. Then, two first type mark patterns are reproduced as a single pattern, and the second type mark pattern between them is not reproduced.

For example, Japanese Patent Publication (unexamined) A56-169211 discloses a magnetic tape apparatus wherein when a mark pattern is recorded on a magnetic tape, the mark pattern is reproduced simultaneously and if any defect is found in the reproduction result, the mark pattern is again recorded. That is, this technique considers only a mark pattern recording and cannot cope with a reproduction failure of a mark pattern recorded in the past.

SUMMARY OF THE INVENTION

It is therefore an object of the present invention to provide a tape reproduction apparatus and method which can eliminate reproduction failure of a mark pattern recorded in the past.

The magnetic tape reproduction apparatus according to an embodiment of the present invention comprises: a tape drive block for linearly feeding a magnetic tape containing a plurality of binary data constituting various mark patterns which are recorded in parallel on a plurality of data tracks and repeated in serial; a data reproduction block for reading the plurality of data tracks in parallel and successively reproducing the binary data from the respective data tracks; a mark detection block for successively identifying as a plurality of mark patterns, a plurality of parallel binary data successively reproduced in serial by the data reproduction block; a time integrating block for integrating a reproduction time of a mark patterns successively identified by the mark detection block; a mark confirmation block for confirming and outputting a mark pattern whose reproduction time integrated by the time integration block has reached a predetermined time; a mark pattern holding block for holding a mark pattern identified by the mark detection block; a discontinuity detection block for detecting a mark discontinuity of the mark pattern for which a reproduction time is integrated by the time integrating block; a discontinuity integrating block for counting the number of times of discontinuity detecting by the discontinuity detecting block; and a correction output block for outputting the number of times integrated by the integration block and the mark pattern held by the mark holding block together with the mark pattern confirmed by the mark confirmation block.

Accordingly, in the tape reproduction method of the tape reproduction apparatus according to the present invention, a plurality of data tracks of the magnetic tape linearly fed by the data drive block are read in parallel by the data reproduction block. After this, respective binary data items are successively reproduced in serial. The plurality of binary data is identified as one of the mark patterns by the mark detection block. For the identified mark pattern, a reproduction time is integrated by the time integration block. When the integrated reproduction time has reached a predetermined reference time, the mark pattern is confirmed by the confirmation block. While a reproduction time is integrated by the time integration block for the mark pattern identified, the mark pattern identified by the mark detection block is held by the mark holding block, and the discontinuity detection block detects a discontinuity of the mark pattern for which reproduction time is integrated by the time integration block. The number of discontinuity times is integrated by the discontinuity integration block. This integrated number of times and the mark pattern held by the mark holding block are output by the correction output block together with the mark pattern confirmed by the mark confirmation block. That is, when the reproduction time has reached the reference time and the mark pattern confirmed is output, the discontinuity times of the integration of the reproduction time of the mark pattern is also output simultaneously, and another mark pattern identified during the integration of the mark pattern reproduction time integration is output.

Accordingly, if before a first mark pattern reproduction time reaches the reference time, a second mark pattern reproduction is started, and if before this second mark pattern reproduction time reaches a reference time, the first mark pattern reproduction is again started, it can be presumed that the first mark pattern confirmed as one mark pattern is actually two and the second mark pattern exists between the two first mark patterns as discontinuity.

The aforementioned tape reproduction apparatus may comprise a result correction block for correcting the output result of the mark confirmation block according to the integration count and the mark pattern from the correction output block. In this case, the result correction block corrects the output result of the mark confirmation block according to the integration count and the mark pattern produced from the correction output block. Accordingly, if before the first mark pattern reproduction time reaches the reference time and the second mark pattern reproduction is started, and if before the second mark pattern reproduction time reaches the reference time, the first mark pattern reproduction is started again, the first mark pattern confirmed as one mark pattern may be divided into two mark pattern for output. And the second mark pattern may be inserted into the discontinuity.

DESCRIPTION OF THE PREFERRED EMBODIMENTS

Figure 1:
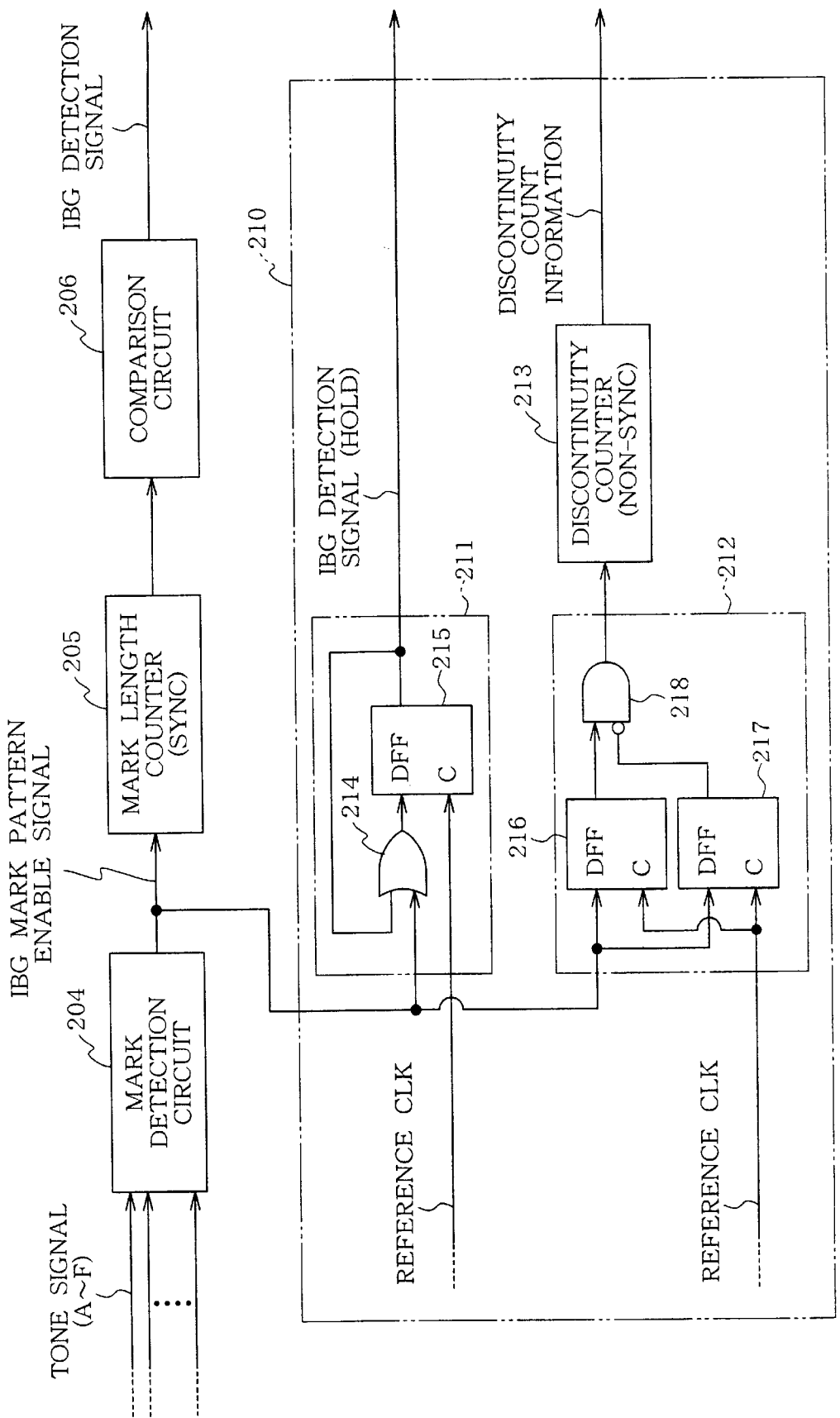
FIG. 1 is a block diagram showing essential portions of a tape reproduction apparatus according to a first embodiment of the resent invention.
Figure 2:
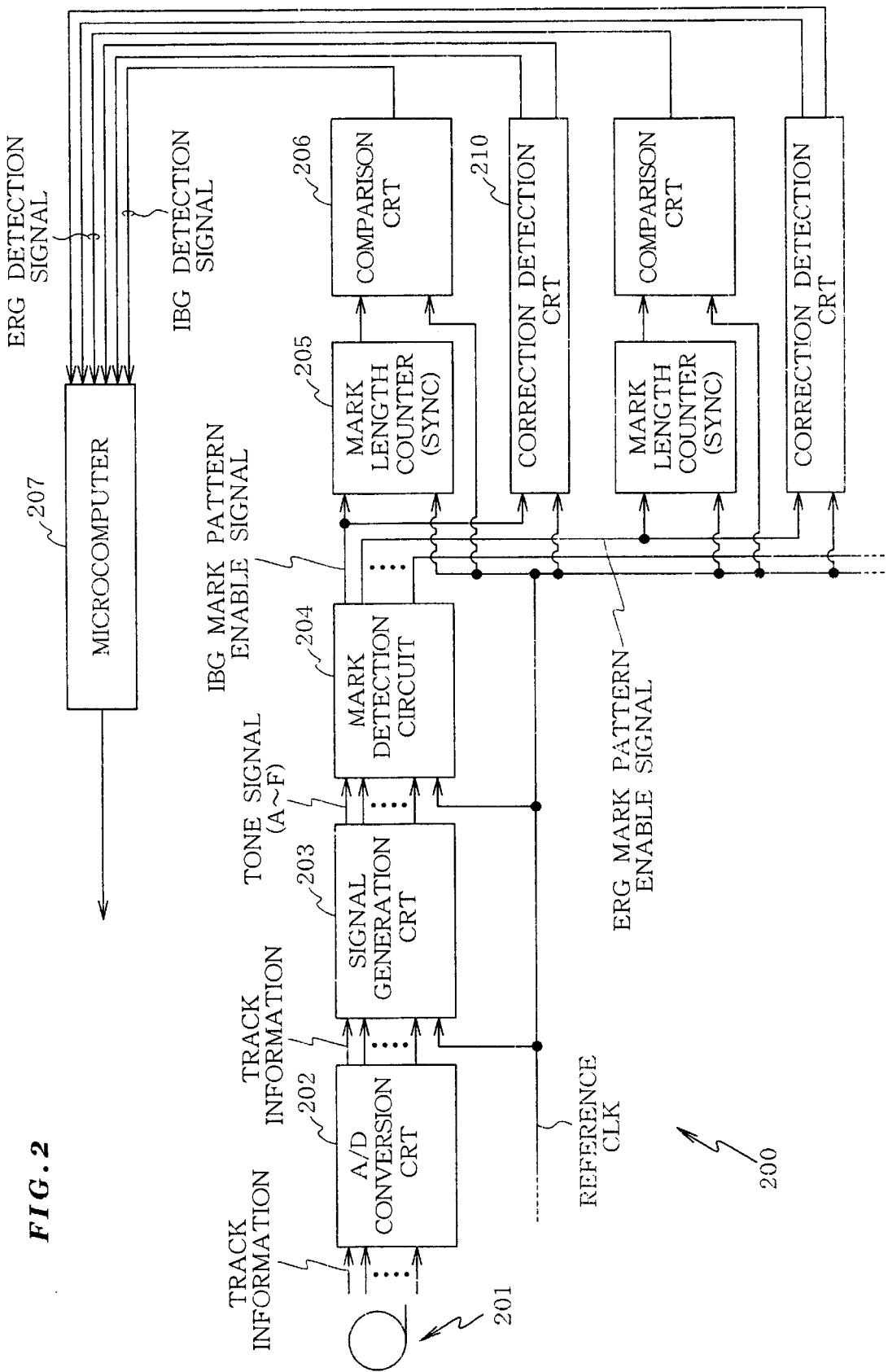
FIG. 2 is a block diagram showing the entire configuration of the tape reproduction apparatus.
Figure 3:
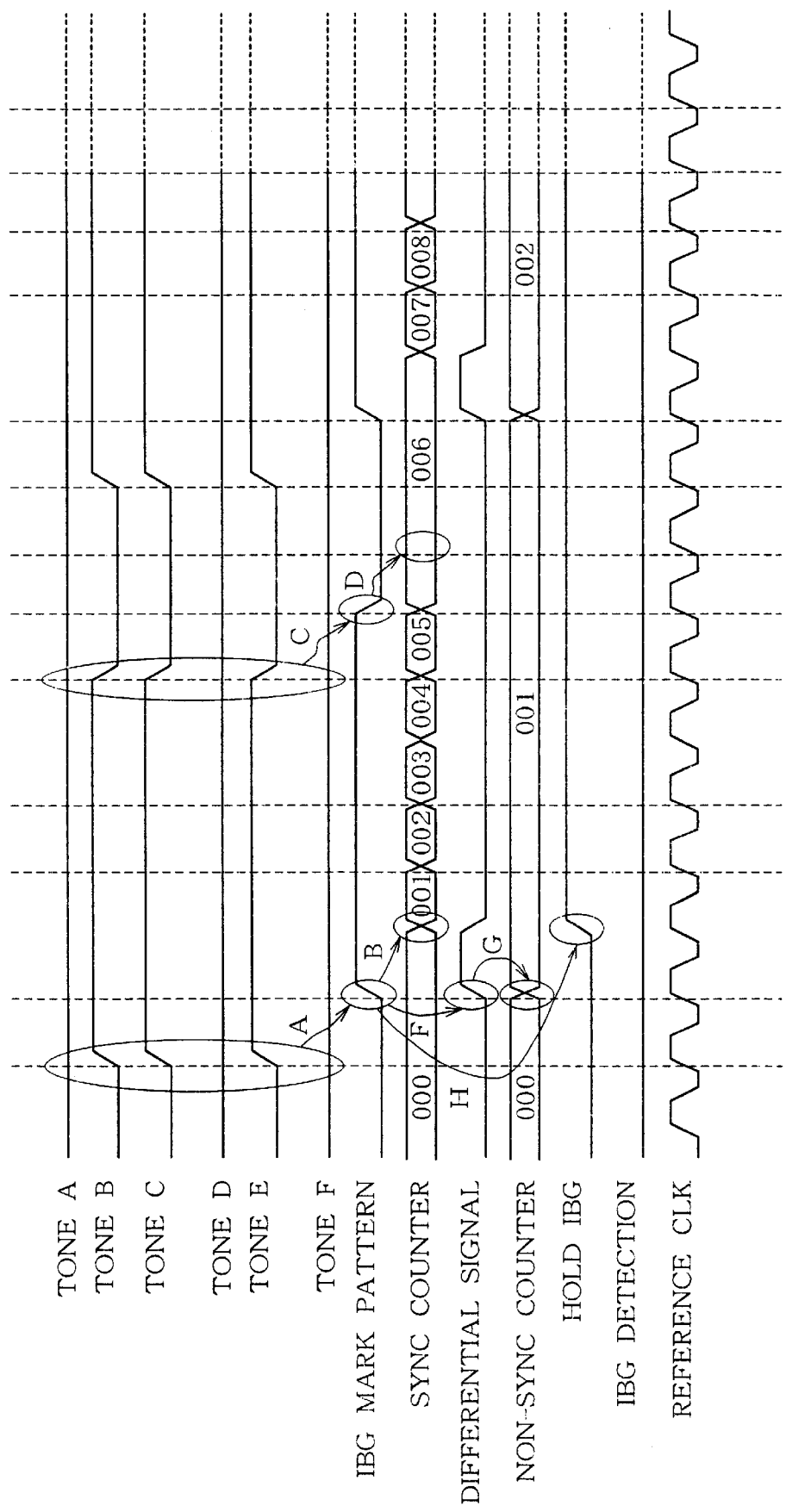
FIG. 3 is a timing chart showing relationships between various signals.

Description will now be directed to a tape reproduction apparatus according to a first embodiment of the present invention with reference FIG. 1 to FIG. 3. FIG. 1 is a block diagram showing an essential portion of the tape reproduction apparatus; FIG. 2 is a block diagram showing the entire configuration of the tape reproduction apparatus; and FIG. 3 is a timing chart showing relationships between various signals.

In the tape reproduction apparatus 200 according to the first embodiment also, various mark patterns are constituted by six binary data, i.e., tone signals and all one signals, and the six binary data are assigned to the six (actually eighteen) data tracks in parallel and repeated in serial.

As shown in FIG. 2, the tape reproduction apparatus 200 of the present embodiment includes a tape drive block 201, which is connected via an A/D conversion circuit 202 to a signal generation circuit 203. The signal generation circuit 203 is connected to a mark detection circuit 204 serving as the mark detection block. This mark detection circuit 204 is connected to six mark length counters 205 serving as time integration means.

That is, in the aforementioned tape reproduction apparatus 100, five mark patterns are used corresponding to a 18-track magnetic tape. On the other hand, in the present embodiment, the tape reproduction apparatus 200 is compatible with a 36-track magnetic tape and "WR" (Wrap Mark) is additionally used.

The six mark length counters 205 are respectively connected to six comparison circuits 206 serving as a mark confirmation block. These comparison circuits are connected to a single microcomputer 207. Thus, The aforementioned tape reproduction apparatus 200 has an identical configuration as the tape reproduction apparatus 100.

However, the tape reproduction apparatus 200 of the present embodiment differs from the aforementioned reproduction apparatus 100 in that six correction detection circuit 210 are connected to the mark detection circuit 204, in parallel to the six mark length counters 205. These correction detection circuit 210 is also connected to the microcomputer 207.

As shown in FIG. 1, the correction detection circuit 210 includes: a mark holding circuit 211 serving as a mark holding means; a differentiation circuit 212 serving as an intermittent detection means; and a discontinuity counter 213 serving as an intermittent integration block. The mark holding circuit 211 is constituted by an OR gate 214 and D type FF (flip flop) 215. The differentiation circuit 212 is constituted by two D type FF 216, 217. It should be noted that the tape reproduction apparatus of the present embodiment also has a clock circuit (not depicted) connected to the aforementioned circuits 203 to 206 and 215 to 217.

The mark holding circuit 211 maintains a mark pattern which has been identified by the mark detection circuit 204 and supplies the mark pattern to the microcomputer 207. The differentiation circuit 212 detects an intermittence of the mark pattern identified by the mark detection circuit 204, and the discontinuity counter 213 integrates the number of times of intermittence detected by the differentiation circuit 212.

As has been described above, a comparison circuit 206 supplies to the microcomputer 207 a detection signal of a mark pattern whose reproduction time has reached a reference time. Here, the microcomputer 207 functions as a correction output block, resultant correction block, and a data reset block.

That is, the microcomputer 207 is supplied with a detection signal from one of the six comparison circuits 206 and fetches an integration count from the discontinuity counter 213 of the six correction detection circuit 210 and a detection signal of the mark pattern from the mark holding circuit 211. Moreover, the microcomputer 207 fetches a mark pattern reproduction time from the five mark length counters 205 connected to the comparison circuit 206 which have not output a detection signal.

Furthermore, the microcomputer 207 corrects the mark pattern detection result from one of the comparison circuits 206 according to the intermittence integration count fetched from the six correction detection circuits 210, the mark pattern fetched from the five correction detection circuit 210, and the reproduction time fetched from the five mark length counters 205.

Moreover, when the microcomputer 207 is supplied with a mark pattern from the comparison circuit 206 and has fetched necessary data items, reset all of the mark length counters 205, the mark holding circuit 211, and the discontinuity counter 213.

Similarly as in the conventional tape reproduction apparatus 100, the tape reproduction apparatus 200 of the present embodiment having the aforementioned configuration can reproduce in serial the mark patterns recorded as combinations of a binary data in parallel on the magnetic tape.

In this case, the tape drive block 201 moves the magnetic tape linearly to read the six data tracks and the six analog signals are respectively converted into digital signals by the A/D conversion circuit 202. If the serial digital signal thus converted is "100000", the signal generation circuit 203 generates the tone signal and otherwise, the all one signal. The parallel six binary data are successively reproduced serially are successively identified as one of the six mark patterns by the mark detection circuit 204.

The mark detection circuit 204 which has identified a mark pattern outputs an enable signal to a corresponding one of the six mark length counters 205. That mark length counter 205 integrates the input time of the enable signal as a mark pattern reproduction time.

The reproduction time integrated by the mark length counter 205 is compared to a predetermined reference time by the comparison circuit 206. If the integrated reproduction time has reached the reference time, a mark pattern detection signal is supplied to the microcomputer 207.

However, in the tape reproduction apparatus 200 according to the present embodiment, when the mark pattern reproduction time identified by the mark detection circuit 204 is integrated by the mark length counter 205, the mark pattern identified by the mark detection circuit 204 is held by the mark holding circuit 211 and the differentiation circuit 212 detects an intermittence of the mark pattern whose reproduction time is integrated by the mark length counter 205.

In this state, if one of the comparison circuits 206 outputs a mark pattern detection signal to the microcomputer 207, the microcomputer 207 fetches an integration count from the discontinuity counter 213 of the six correction detection circuits 210. Furthermore, the microcomputer 207 fetches detection signals from the mark holding circuits 211 of the remaining five mark patterns for which no detection signal has been output from the comparison circuit 206, and a mark pattern reproduction time from the remaining five mark length counters 205.

More specifically, as shown in FIG. 3, the signal generation circuit 203 outputs six binary data TONE-A to TONE-F patterns in parallel which are "011010" along the track number, and if this pattern corresponds to an IBG mark (A), the mark detection circuit 204 outputs an IBG mark pattern enable signal to a corresponding mark length counter 205 and to the correction detection circuit 210 (B, F, H).

While an enable signal is supplied from the mark detection circuit 204, the mark length counter 205 integrates the IBG mark reproduction time in synchronization with the reference clock. If the six-binary data set becomes other than the IBG (C) before the integrated reproduction time reaches the reference time, the mark detection circuit 204 terminates output of the enable signal (D), and the IBG mark reproduction time integration by the mark length counter 205 is also interrupted.

In this state, if a six binary data set again corresponds to the IBG mark before other mark patterns are identified, and the IBG mark reproduction time integrated by the mark length counter 205 reaches a reference time, the comparison circuit 206 produces an IBG mark detection signal to the microcomputer 207.

Note that when the mark detection circuit 204 outputs an IBG mark enable signal, the rising edge is differentiated (F) by the differentiation circuit 212 and integrated (G) by the discontinuity counter 213. Thus, actually, the differentiation circuit 212 detects also mark pattern identification as a discontinuity. Accordingly, the microcomputer 207 deletes "1" from the integrated count of the discontinuity counter 213 so as to obtain a discontinuity count.

Moreover, when the mark detection circuit 204 outputs an IBG mark enable signal, the IBG mark detection signal is held (H) by the mark holding circuit 211. Accordingly, when the microcomputer 207 receives a mark pattern detection signal from any one of the comparison circuits 206, the microcomputer 207 can fetch a data on presence/absence of the other detection signals from the mark holding circuit 211.

That is, in the tape reproduction apparatus 200 of the present embodiment, when a reproduction time has reached a reference time and a mark pattern is identified and the mark pattern is supplied to the microcomputer 207, the discontinuity count during the integration of the mark pattern reproduction time is also output. And during integration of a reproduction time of the mark pattern, another mark pattern is identified and output together with the reproduction time.

The microcomputer 207 corrects the mark pattern detection result from one of the comparison circuits 206 according to the intermittence integration count fetched from the six discontinuity counter 213, the mark pattern detection signal fetched from the five mark holding circuits 211, and the reproduction time fetched from the five mark length counter 205, and the like.

For example, it is assumed that a second mark pattern reproduction is started before a first mark pattern reproduction time reaches a reference time, and the first mark pattern reproduction is again started before the second mark pattern reproduction time reaches a reference time.

In this case, the microcomputer 207 detects a discontinuity in the first mark pattern and presumes possibility of another mark pattern generation. The presence/absence of another mark pattern generation can be known through presence/absence of a detection signal held in the corresponding mark holding circuit 211.

If it is decided that a second mark pattern has been generated, a reproduction time is fetched from the corresponding mark length counter 205. If this reproduction time satisfies a uniquely defined allowance time, generation of the second mark pattern is allowed, which in turn divides the first mark pattern into two portions.

As has been described above, in the tape reproduction apparatus 200 of the present embodiment, if a defective pattern is involved when reproducing various mark patterns from a magnetic tape, it is possible to presume a mark pattern according to its continuity and discontinuity. Accordingly, even if the magnetic tape has a worn out portion and the data recorded on that portion cannot be preferably read out, it is possible to preferably reproduce the mark patterns recorded.

Moreover, as has been described, when the microcomputer 207 is supplied with a mark pattern from the comparison circuit and has fetched various necessary data items, the microcomputer 207 resets all the mark length counters 205, the mark holding circuit 211, and the discontinuity counter 213. This assures the mark pattern reproduction time integration, temporary holding of a mark pattern, and mark pattern discontinuity integration.

Figure 4:
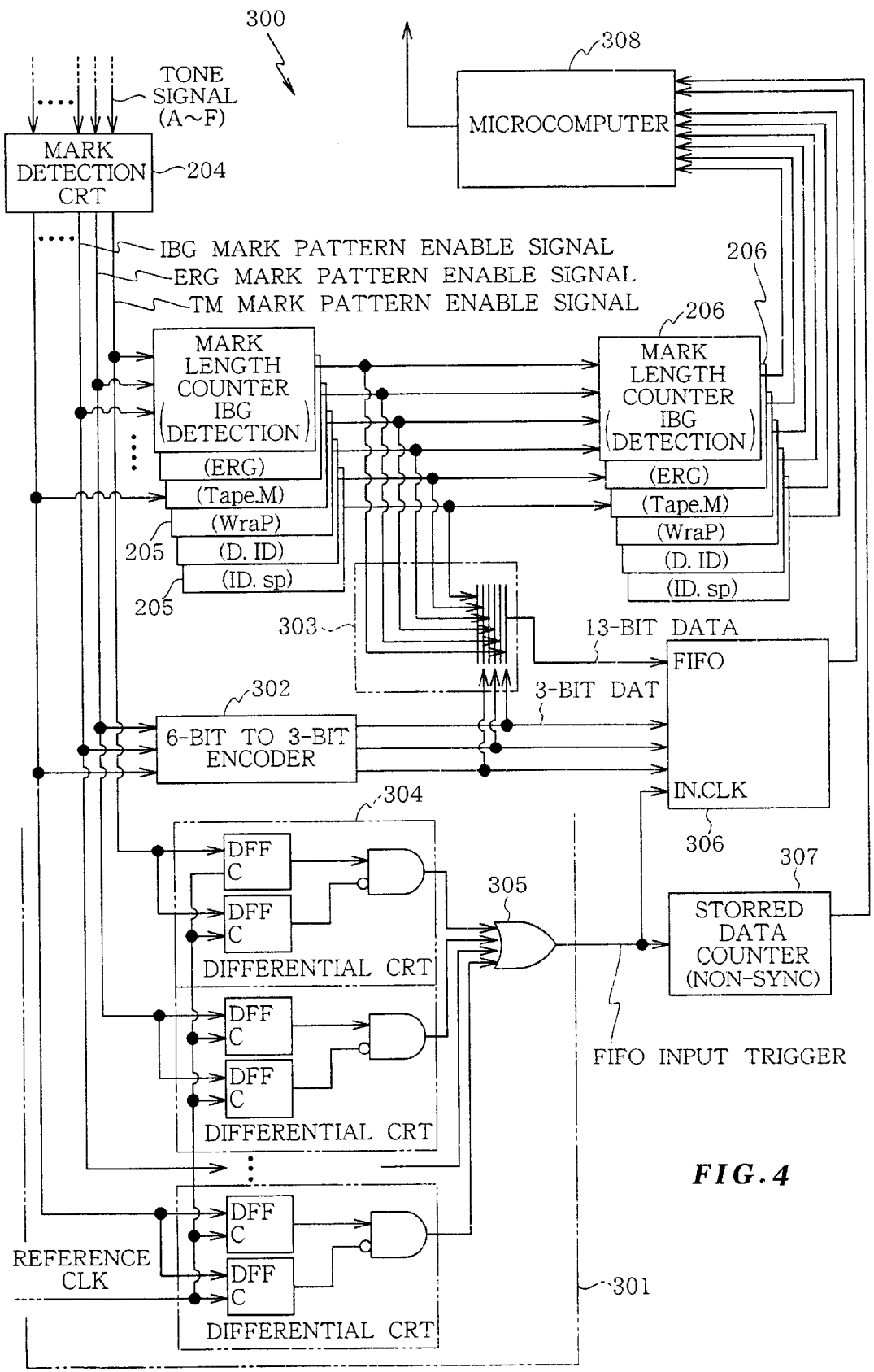
FIG. 4 is a block diagram showing essential portions of the tape reproduction apparatus according to a second embodiment of the present invention.
Figure 5:
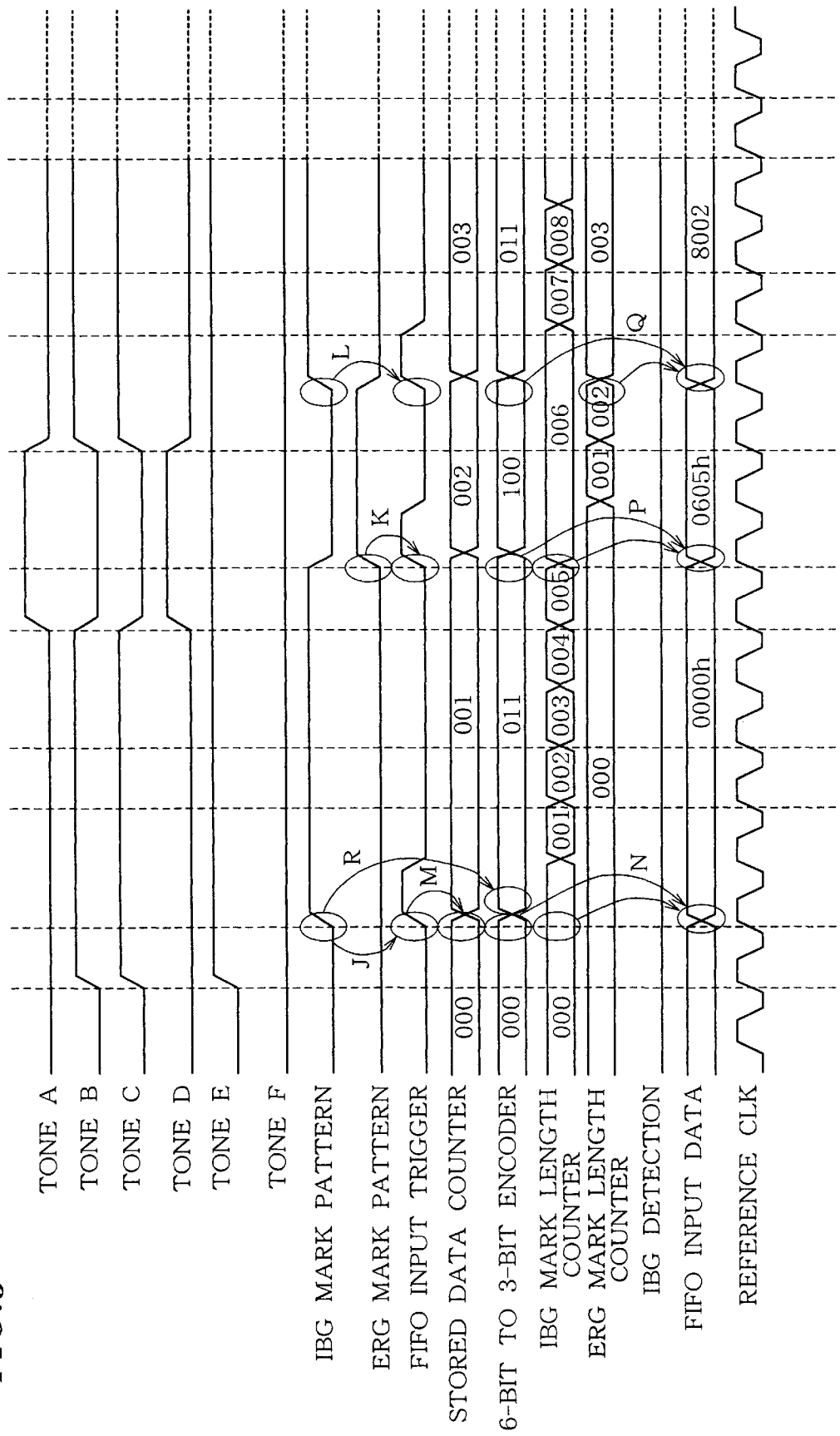
FIG. 5 is another timing chart showing relationships between various signals.
Figure 6:
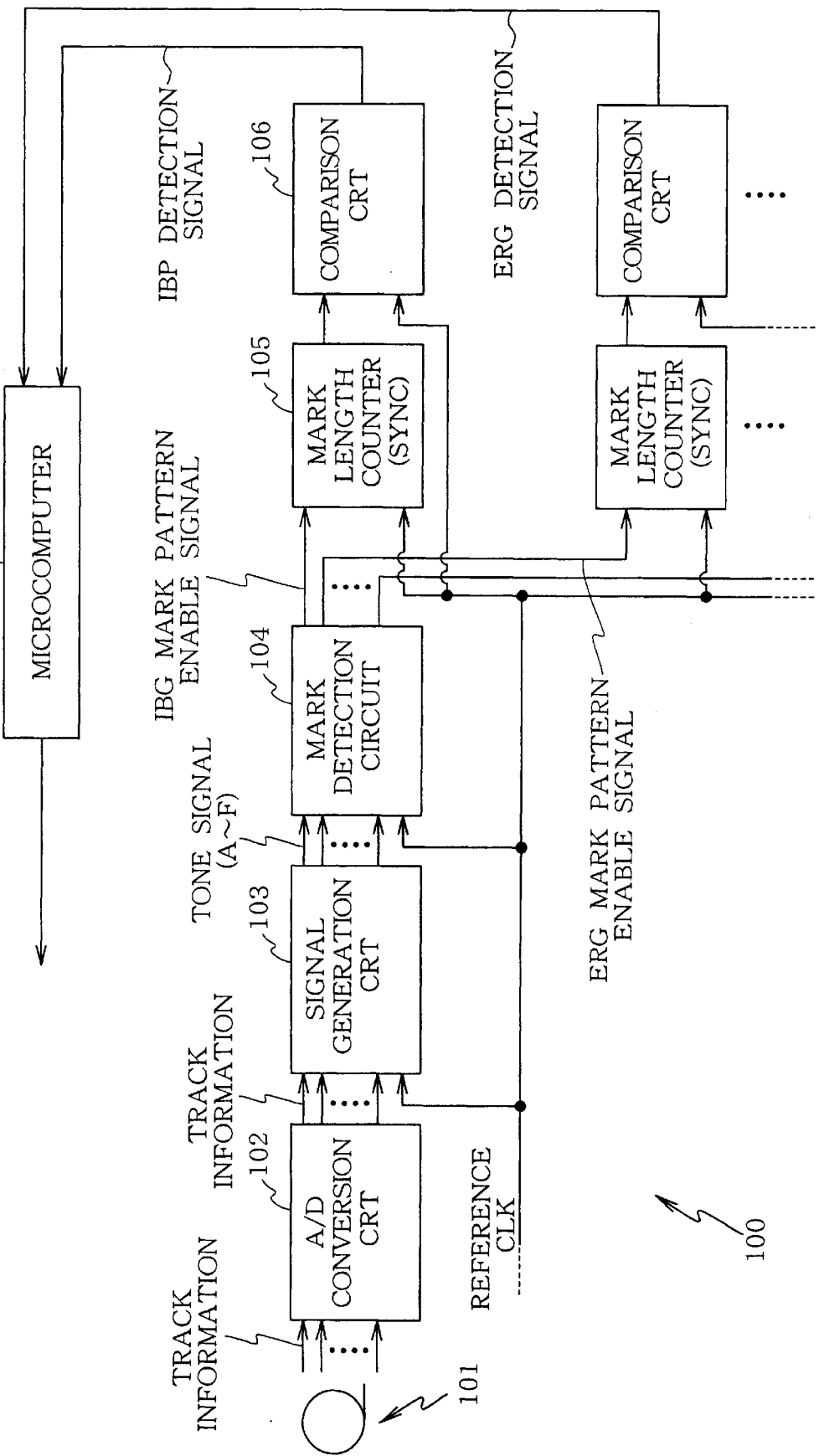
FIG. 6 is a block diagram showing a conventional tap reproduction apparatus.
Figure 7:
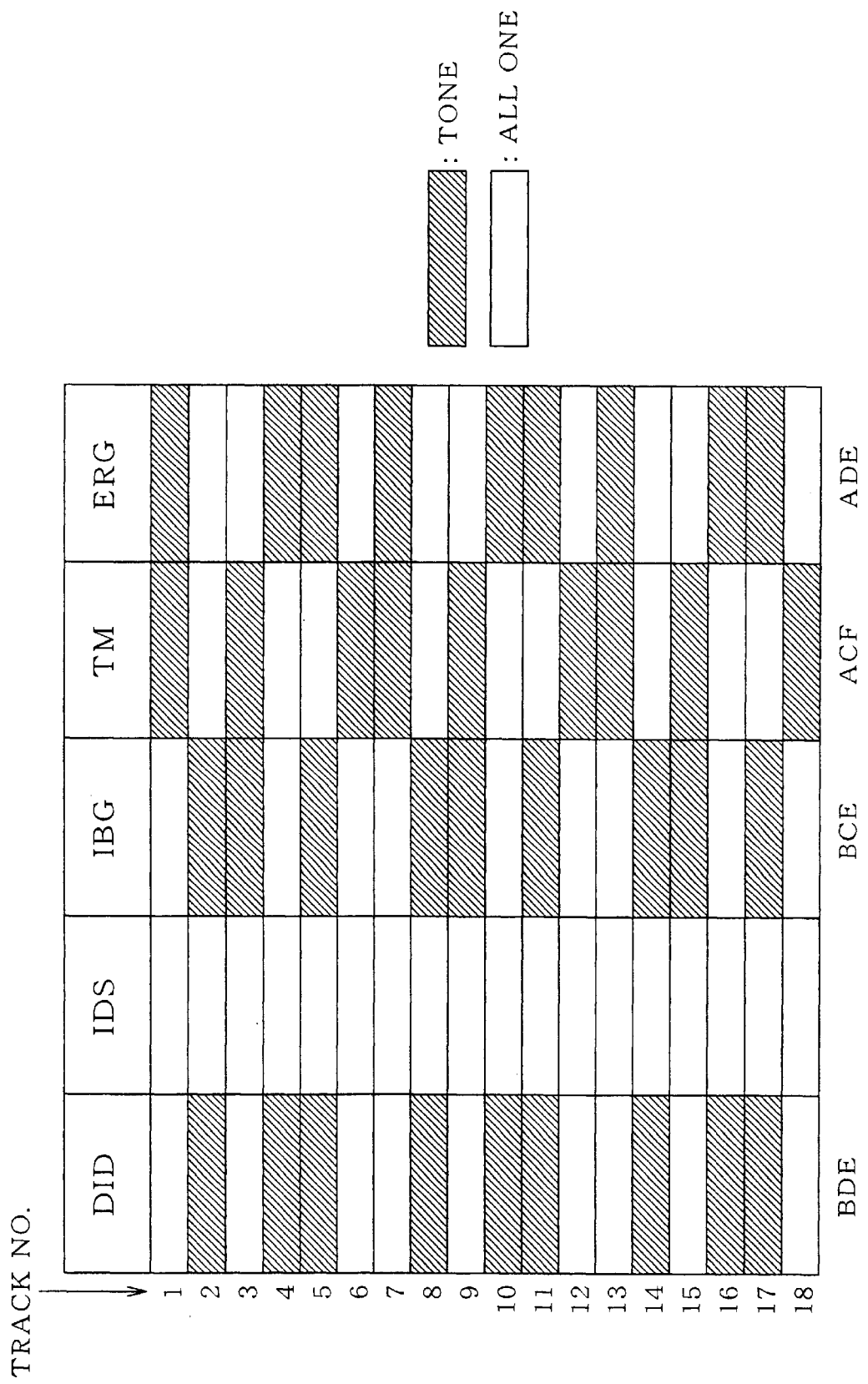
FIG. 7 shows five mark patterns defined by a binary data.

Description will now be directed second embodiment of the present invention. Like components as the first embodiment are denoted by like reference symbols and their explanation will be omitted. Note that FIG. 4 is a block diagram showing an essential portion of the tape reproduction apparatus of the second embodiment, and FIG. 5 is a timing chart showing relationships between various signals.

Unlike the tape reproduction apparatus 200 of the first embodiment, the tape reproduction apparatus 300 of the second embodiment has only one correction detection circuit 301. As shown in FIG. 4, this correction detection circuit 301 includes: an encoder circuit 302 serving as a data compression block; a selector circuit 303, six differentiation circuits 304, an OR gate 305, a pattern accumulation block FIFO (first in first out) memory 306, and a data counter 307 serving as a discontinuity integration block.

The encoder circuit 302 accepts as a 6-bit input signal, an enable signal of the six mark patterns output in parallel, and as shown in a table below, encodes the 6-bit input signal into a 3 bit data.

TABLE 2

| Mark type | Encode Result |
| --- | --- |
| Density ID Mark | 001 |
| ID separator | 010 |
| IBG | 011 |
| ERG | 100 |
| Tape Mark Tape Mar | 101 |
| Wrap Mark | 110 |

The selector circuit 303, selects one of the six mark length counters 205 according to the six mark pattern identification data encoded by the encoder circuit 302, and supplies the selected as a 13-bit mark pattern reproduction time to the FIFO memory.

The six differentiation circuit 304 is supplied with enable signals of six mark pattern output in parallel from the mark detection circuit 204. Each of the six differentiation circuit 304 differentiates a rising edge of the enable signal. The OR gate 305 performs a logical OR of the differentiated results of the six differentiation circuit 304. Thus, the OR gate 305 and the six differentiation circuits 304 detect as a change detection block, the mark pattern change.

The FIFO memory 306 uses as an input trigger the output signal of the OR gate 305 synchronized with a mark pattern change, and successively accumulates a 3-bit identification data of a mark pattern which has been identified by the mark detection circuit 204 and encoded by the encoder circuit 302, and a 13-bit reproduction time of a mark pattern which has been counted by the mark length counter 205 and selected by the selector circuit 303.

The data counter 307 counts output signals from the OR gate 305 synchronized by the mark pattern, so as to integrate the number of changes of the mark patterns. The integration count of the data counter 307 and the accumulated data of the FIFO memory 306 are supplied to the microcomputer 308 together with a mark pattern detection signal from the comparison circuit 206.

The microcomputer 308 has a hardware configuration identical to that of the aforementioned microcomputer 207 and functions as a correction output block, result correction block, and data reset block, but differs from 307 in the control program description mounted as a firmware piece, but functions are partially modified.

That is, when the microcomputer 308 is supplied with a detection signal from one of the six comparison circuit 206, the microcomputer 308 fetches an integration count from the data counter 307. Based on the number of the integration count, the microcomputer 308 fetches both a mark pattern identification data and a reproduction time from the FIFO memory.

Furthermore, the microcomputer 308 corrects the mark pattern detection result from one of the comparison circuits 206, according to combinations of the mark pattern and reproduction time.

Moreover, when the microcomputer 308 is supplied with a mark pattern from a comparison circuit and has fetched a necessary data items from the FIFO memory 306 and the data counter 307, the microcomputer 308 resets all the mark length counters 205, the FIFO memory 306, and the data counter 307.

In the same way as the tape reproduction apparatus 200, the tape reproduction apparatus 300 having the aforementioned configuration can successively reproduce mark patterns from a magnetic tape and correct mark patterns, presuming the mark pattern reproduction defects.

More specifically, in the tape reproduction apparatus 300 of the second embodiment, as shown in FIG. 5, when the mark detection circuit 204 identifies one of the six mark patterns (J, K, L), its reproduction time is integrated one of the six mark length counters 205, and 6-bit identification data is encoded into a 3-bit data (R) by the encoder circuit 302. This change is detected by the six differentiation circuit 304 and the OR gate 305.

According to the identification data which has been encoded into a 3-bit data by the encoder circuit 302, one of the six mark length counters 205 is selected by the selector circuit 303. Thus, each time a mark pattern is changed, a corresponding reproduction time is selected.

Simultaneously with this, the OR gate 305 outputs a detection signal indicating the mark pattern change, to the FIFO memory 306 and to the data counter 307. Thus, the data counter 307 accumulates the mark pattern change count according to the signal input.

Each time the mark pattern changes (J, K, L), the FIFO memory 306 successively accumulates the mark pattern identification data which has been encoded into a 3-bit data by the encoder circuit and the reproduction time integrated by the mark length counter 205 selected by the selector circuit 303 (N, P, Q).

The comparison circuit 206 supplies the microcomputer 308 with a mark pattern as a detection result, reproduction time of which mark pattern accumulated by the mark length counter 205 has reached a reference time. When the microcomputer 308 is supplied with the mark pattern detection result, the microcomputer 308 fetches the mark pattern change count from the data counter. Based on the number of the mark pattern change count, the microcomputer 308 fetches both an identification data and a reproduction time from the FIFO memory. For instance, if the number of the mark pattern change count is three, both an identification data and a reproduction time are fetched for three times.

Next, microcomputer 308 decides whether correction is required for the mark pattern supplied from the comparison circuit 206, according to a predetermined algorithm using various data items fetched from the FIFO memory 306 and the data counter 307. Thus, the microcomputer corrects the mark pattern detection result according to the fetched data.

For example, as shown in FIG. 5, when an IBG mark, an ERG mark, and another IBG mark are successively generated, if the first IBG and the ERG mark have a reproduction time not reaching the reference time, a reproduction time of the second IBG mark may be added to the first IBG mark reproduction time.

However, in the tape reproduction apparatus 300 of the second embodiment, in the aforementioned situation, the microcomputer 308 supplied with the IBG mark detection signal also fetches the ERG mark identification data and reproduction time, and according to these fetched data items, the microcomputer 308 can presume that actually, an IBG mark, a ERG mark, and another IBG mark are successively generated and output a reproduction data corrected.

It should be noted that the microcomputer 308 which has received a mark pattern from the comparison circuit 206 and various data items from the FIFO memory 306 and the data counter 307, the microcomputer 308 reset all the mark length counters 205, the FIFO memory 306, and the data counter 307.

Accordingly, this tape reproduction apparatus 300 of the second embodiment can properly perform integration and a temporary holding of a mark pattern reproduction time, and a temporary holding of another mark pattern identified during a mark pattern reproduction.

Furthermore, a mark pattern to be accumulated by the FIFO memory 306 is compressed by the encoder circuit 302, it is possible to save the data capacity of the FIFO memory 306 and accordingly, effectively use the hard resources. It should be noted that the actual data capacity and the number of accumulation stages of the FIFO memory 306 are preferably determined by considering the apparatus specification and performance.

It should be noted that the present invention is not to be limited to the aforementioned embodiments and can be subjected to various modifications without departing from the concept of the present invention. For example, in the aforementioned configuration, the tape reproduction apparatus 200 and 300 have hardware components dedicated to specific purposes. This assures to perform a data processing at a high speed with a simple configuration.

However, it is also possible to mount an appropriate software piece on the computer so as to realize the components of the tape reproduction apparatus 200 and 300. It is also possible to realize some parts as a software piece and other parts as a hardware piece.

The present invention having the aforementioned configuration has effects as follows.

In a tape reproduction apparatus according to the present invention, a plurality of data tracks of a magnetic tape linearly moved by the tape drive block are read in parallel by the data reproduction block and a binary data is successively reproduced in serial. The plurality of parallel binary data successively reproduced in serial are successively identified by the mark detection block as one of the plurality of mark patterns. The reproduction time of the identified mark pattern is integrated by the time integrator. When the integrated reproduction time has reached a predetermined reference time, the corresponding mark pattern is confirmed by the mark confirmation block so as to be output. When the reproduction time of the mark pattern is integrated by the time integrator, the mark pattern identified by the mark detector is held by the mark holder, and the continuance/discontinuity detection block detects the continuance or discontinuity of the mark pattern whose reproduction time is integrated. The discontinuity count detected is integrated by the discontinuity integrator. The integrated count and the mark pattern held by the mark holder are output together with the mark pattern confirmed by the mark confirmation block.

Accordingly, it is possible to output a discontinuity count, which in turn enables to properly correct a mark pattern reproduction defect.

In the aforementioned tape reproduction apparatus, the result correction block corrects the output result of the confirmation block according to the integration count and the mark pattern output from the correction output block.

Thus, it is possible to properly correct a mark pattern reproduction defect.

In the aforementioned tape reproduction apparatus, each time the mark confirmation block outputs a mark pattern, the data reset block resets the time integration block, the mark holding block, and the discontinuity integration block.

Thus, it is possible to properly perform the mark pattern reproduction time integration, mark pattern temporary holding, and mark pattern discontinuity integration.

In the other tape reproduction apparatus of the present invention, when the time integrator integrates the reproduction time of the mark pattern identified by the mark detector, the change detector detects a change of the mark pattern identified by the mark detector. Each time this change is detected, a mark pattern identified by the mark detector is successively accumulated by the pattern accumulator together with the reproduction time integrated by the time integrator. The correction output block outputs the accumulated mark pattern and the reproduction time together with a mark pattern confirmed by the mark confirmation block.

That is, during integration of a reproduction time of the mark pattern confirmed, it is possible to output another mark pattern identified together with a reproduction time. This enables properly correct a mark pattern reproduction defect.

In the tape reproduction apparatus having the aforementioned configuration, the result corrector corrects the mark confirmation output result according to the mark pattern and the reproduction time supplied from the correction output block. This enables to properly correct the mark pattern reproduction defect.

In the aforementioned tape reproduction apparatus, each time the mark confirmation block outputs a mark pattern, the time integrator and the pattern accumulation block are reset.

This enables to properly perform integration of a mark pattern reproduction time, temporary holding of another mark pattern identified during a mark pattern reproduction, and temporary holding of the reproduction time of this mark pattern.

In the aforementioned tape reproduction apparatus, at least one of the mark pattern and the reproduction time accumulated by the pattern accumulating block is compressed by a data compression block. This enables to save the data capacity of the pattern accumulation block.

In the aforementioned tape reproduction apparatus, the discontinuity accumulating block integrates the mark pattern changes and the correction output block can output a mark pattern and a reproduction time for the number of times accumulated. The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-266949 (Filed on Sep. 21, 1998) including specification, claims, drawings and summary are incorporated herein by reference in its entirety.

What is claimed is:

1. A magnetic tape reproduction apparatus for reproducing a magnetic tape containing a plurality of binary data constituting various mark patterns which are recorded in parallel on a plurality of data tracks and repeated in serial, the apparatus comprising:

a tape drive block for linearly moving said tape;

a data reproduction block for reading the plurality of data tracks in parallel and successively reproducing the binary data from the respective data tracks;

a mark detection block for successively identifying as a plurality of mark patterns, a plurality of parallel binary data successively reproduced in serial by the data reproduction block, and when a mark pattern is identified, makes the enable signal Hi for the corresponding mark;

a differentiation circuit provided for each of the mark pattern types so as to detect a rise of the enable signal of a corresponding mark produced from said mark detection block, and outputting a differentiation signal; and a microprocessor for identifying a mark pattern according to the reproduction time of the enable signal and the output of the differentiation circuit.

2. A tape reproduction apparatus as claimed in claim 1, wherein if a plurality of differentiation signals are produced by said differentiation circuit during a normal reproduction time of the enable signal, said microprocessor determines that the mark pattern is generated for the input count of the differentiation signal.

3. A tape reproduction apparatus as claimed in claim 1, the apparatus further comprising a plurality of holding circuits for holding an enable signal for each of the mark patterns produced from the mark detection circuit, wherein if a plurality of differentiation signals are produced from the differentiation circuit within a normal reproduction time of the enable signal, the microprocessor reads out the mark pattern held in the holding circuit.

4. A magnetic tape reproduction apparatus comprising:

a tape drive block for linearly feeding a magnetic tape containing a plurality of binary data constituting various mark patterns which are recorded in parallel on a plurality of data tracks and repeated in serial;

a data reproduction block for reading the plurality of data tracks in parallel and successively reproducing the binary data from the respective data tracks;

a mark detection block for successively identifying as a plurality of mark patterns, a plurality of parallel binary data successively reproduced in serial by the data reproduction block;

a time integrating block for integrating a reproduction time of a mark patterns successively identified by the mark detection block;

a mark confirmation block for confirming and outputting a mark pattern whose reproduction time integrated by the time integration block has reached a predetermined time;

a mark pattern holding block for holding a mark pattern identified by the mark detection block;

a discontinuity detection block for detecting a mark discontinuity of the mark pattern for which a reproduction time is integrated by the time integrating block;

a discontinuity integrating block for counting the number of times of discontinuity detecting by the discontinuity detecting block; and a correction output block for outputting the number of times integrated by the integration block and the mark pattern held by the mark holding block together with the mark pattern confirmed by the mark confirmation block.

5. A tape reproduction apparatus as claimed in claim 4, the apparatus further comprising a result correction block for correcting an output result from the mark confirmation block according to the integration count from the correction output block and the mark pattern.

6. A tape reproduction apparatus as claimed in claim 4, the apparatus further comprising a data reset block for resetting the time integration block, the mark holding block, and the discontinuity integration block each time the mark configuration block outputs a mark pattern.

7. A magnetic tape reproduction apparatus comprising:

a tape drive block for linearly feeding a magnetic tape containing a plurality of binary data constituting various mark patterns which are recorded in parallel on a plurality of data tracks and repeated in serial, a data reproduction block for reading the plurality of data tracks in parallel and successively reproducing the binary data from the respective data tracks;

a mark detection block for successively identifying as a plurality of mark patterns, a plurality of parallel binary data successively reproduced in serial by the data reproduction block;

a time integrating block for integrating a reproduction time of a mark patterns successively identified by the mark detection block;

a mark confirmation block for confirming and outputting a mark pattern whose reproduction time integrated by the time integration block has reached a predetermined time;

a change detection block for detecting a change of the mark pattern identified by the mark detection block;

a pattern accumulating block for successively accumulating the mark pattern identified by the mark detection block together with the reproduction time integrated by the time integration block each time the change detection means detects a change; and a correction output block for outputting the mark pattern and the reproduction time accumulated by the pattern accumulation block together with the mark pattern confirmed by the mark confirmation block.

8. A tape reproduction apparatus as claimed in claim 7, the apparatus further comprising a result correction block for correcting the output result of the mark confirmation block, according to the mark pattern and the reproduction time supplied from the correction output block.

9. A tape reproduction apparatus as claimed in claim 7, the apparatus further comprising a data reset block for resetting the time integration block and the pattern accumulation block each time a mark pattern is output from the mark confirmation block.

10. A tape reproduction apparatus as claimed in claim 7, the apparatus further comprising a data compression block for compressing at least one of the mark pattern and the reproduction time accumulated by the pattern accumulating block.

11. A tape reproduction apparatus as claimed in claim 7, the apparatus further comprising a discontinuity integrating block for integrating the number of times of a change detected by the change detection block.

12. A tape reproduction method comprising steps of:

linearly feeding a magnetic tape having a plurality of binary data on a plurality of data tracks so as to constitute various mark patterns;

reading in parallel the plurality of data tracks of the magnetic tape;

successively reproducing the binary data in serial from the plurality of data tracks;

successively identifying as one of the plurality of mark patterns the binary data reproduced successively;

integrating the reproduction time of the mark pattern identified;

confirming the mark pattern for which the integrated reproduction time has reached a predetermined reference time;

holding the mark pattern identified;

detecting a discontinuity of the mark pattern for which the reproduction time is integrated;

integrating the number of the discontinuity times; and outputting the integrated number of times and the mark pattern held together with the mark pattern confirmed.

13. A tape reproduction method comprising steps of:

linearly feeding a magnetic tape having a plurality of binary data on a plurality of data tracks so as to constitute various mark patterns;

reading in parallel the plurality of data tracks of the magnetic tape;

successively reproducing the binary data in serial from the plurality of data tracks;

successively identifying as one of the plurality of mark patterns the binary data reproduced successively;

integrating the reproduction time of the mark pattern identified;

confirming the mark pattern for which the integrated reproduction time has reached a predetermined reference time;

detecting a mark pattern change identified;

successively accumulating the mark pattern identified, together with the integrated reproduction time; and outputting the accumulated mark pattern and the reproduction time together with the mark pattern confirmed.

* * * * *